United States Patent
Joshi et al.

(10) Patent No.: US 6,975,868 B2
(45) Date of Patent: Dec. 13, 2005

(54) METHOD AND APPARATUS FOR IS-95B REVERSE LINK SUPPLEMENTAL CODE CHANNEL FRAME VALIDATION AND FUNDAMENTAL CODE CHANNEL RATE DECISION IMPROVEMENT

(75) Inventors: Abhay Joshi, San Diego, CA (US); Baaziz Achour, San Diego, CA (US); Serguei Glazko, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 603 days.

(21) Appl. No.: 09/790,358

(22) Filed: Feb. 21, 2001

(65) Prior Publication Data

US 2002/0160782 A1 Oct. 31, 2002

(51) Int. Cl.[7] .................................. H04Q 7/20
(52) U.S. Cl. ........................ 455/452; 370/335
(58) Field of Search .................. 455/452.1, 452.2, 455/450, 451, 454; 370/335, 342, 341, 338

(56) References Cited

U.S. PATENT DOCUMENTS

| | | | | |
|---|---|---|---|---|
| 5,416,787 A | * | 5/1995 | Kodama et al. ............ 714/790 |
| 5,751,725 A | * | 5/1998 | Chen ........................ 455/422 |
| 5,771,226 A | * | 6/1998 | Kaku ........................ 370/232 |
| 5,809,059 A | * | 9/1998 | Souissi et al. ............. 375/133 |
| 5,946,356 A | * | 8/1999 | Felix et al. ................ 455/422 |
| 6,047,175 A | * | 4/2000 | Trompower ............. 455/452.1 |
| 6,088,335 A | * | 7/2000 | I et al. ..................... 370/252 |
| 6,108,372 A |   | 8/2000 | Tidemann, Jr. et al. ..... 375/225 |
| 6,178,330 B1 | * | 1/2001 | Alberty et al. ........... 455/452.2 |
| 6,229,795 B1 | * | 5/2001 | Pankaj et al. ............. 370/329 |
| 6,333,926 B1 | * | 12/2001 | Van Heeswyk et al. .... 370/335 |
| 6,347,080 B2 | * | 2/2002 | Jou et al. ................. 370/310 |
| 6,377,809 B1 | * | 4/2002 | Rezaiifar et al. .......... 455/455 |
| 6,393,012 B1 | * | 5/2002 | Pankaj ..................... 370/342 |
| 6,452,911 B1 | * | 9/2002 | Seo ........................ 370/335 |
| 6,516,196 B1 | * | 2/2003 | Chen et al. ................ 455/450 |
| 6,574,211 B2 | * | 6/2003 | Padovani et al. .......... 370/347 |
| 6,594,241 B1 | * | 7/2003 | Malmlof ................... 370/329 |

FOREIGN PATENT DOCUMENTS

EP  0920160  6/1999  ........... H04L/25/02

OTHER PUBLICATIONS

ANSI/TIA/EIA, "Mobile Station Base Station Compatibility Standard for Wideband Spread Spectrum Cellular Systems", Telecommunications Industry Association, Mar. 1999, pps. 6–46.

* cited by examiner

Primary Examiner—ChongVan Tran
(74) Attorney, Agent, or Firm—Charles D. Brown; Bruce W. Greenhaus; Richard A. Bachand

(57) ABSTRACT

The present invention provides a method and apparatus for maximizing throughput of a data call in a wireless communication system in which data is transmitted from a wireless station, such as a mobile station, on multiple assigned channels in accordance with a known transmission standard, such as IS-95B. The multiple assigned channels include a fundamental channel and at least one supplemental channel. Data is formatted into variable rate data frames and transmitted on the fundamental channel and the supplemental channel. A wireless receiver, such as a base station, receives the multiple assigned channels. The wireless receiver demodulates and decodes data frames associated with each of the multiple assigned channels. The wireless receiver determines a likely initial data rate for each demodulated and decode data frame. The wireless receiver correlates all of the likely data rates, by comparison to one another and to a relevant transmission protocol standard, to determine a maximum likelihood combination of data rates. The maximum likelihood combination of data rates includes a maximum likelihood data rate corresponding to each likely data rate. Decoded data frames are invalidated and erased when the likely data frame rates do not match corresponding maximum likelihood data rates.

20 Claims, 7 Drawing Sheets

METHOD AND APPARATUS FOR IS-95B REVERSE LINK SUPPLEMENTAL CODE CHANNEL FRAME VALIDATION AND FUNDAMENTAL CODE CHANNEL RATE DECISION IMPROVEMENT

BACKGROUND OF THE INVENTION

1. Field of the Invention

The present invention relates generally to wireless communication systems, and more particularly, to such a system for maximizing the useful data transmission throughput in a data call in which data is transmitted between wireless stations on multiple assigned channels.

2. Related Art

A wireless communication system can be used to transmit synchronous and asynchronous packet data between a wireless transmitter and a wireless receiver. For example, the wireless communication system can operate in accordance with a High Speed Packet Data (HSPD) feature of the "TIA/EIA/IS-95B Mobile Station-Base Station Compatibility Standard for Dual-mode Wideband Spread Spectrum Cellular Systems" (hereinafter referred to as IS-95B) to achieve a packet data transmission bandwidth of up to 115 kilobits-per-second (kbps). Under IS-95B, a mobile station can transmit data to a base station receiver on an IS-95B reverse-link traffic channel including a fundamental code channel (FCCH) and up to seven additional Supplemental Code Channels (SCCHs). The FCCH is a variable rate channel capable of operating at data transmission rates including a full rate, a half rate, a quarter rate, and an eighth rate. On the other hand, the SCCH operates only at a full rate when data is to be transmitted, and at a zero rate when no data is available.

Packet data transmitted on the FCCH and SCCHs is partitioned into 20 millisecond (ms) variable rate data frames. Although the data rate can change rapidly, for example, on a frame by frame basis, rate information is typically not included in each transmitted data frame for at least two reasons. First, including rate information in each data frame wastes data bandwidth, and second, corruption of such transmitted rate information would adversely affect the entire frame. Since rate information is not included in each transmitted data frame, the receiver must determine from each received data frame (without the aid of embedded rate information) the rate at which the frame was transmitted, to thereby enable the receiver to properly process the data in the data frame. Known methods of determining data frame rates exist for voice only traffic. However, such methods are insufficiently accurate and thus unsuitable for packet data traffic.

Therefore, there is a need in a variable rate communication system to accurately determine a transmitted data rate for packet data traffic at a receiver without embedding rate information into the transmitted data.

In the above described communication system, the mobile station sends signaling requests for SCCH assignment and de-assignment to the base station based on the amount of data the mobile station needs to transmit. In response, the base station dynamically allocates and de-allocates SCCHs via signaling messages. Assigning and de-assigning SCCHs via such signaling can be a relatively slow mechanism and thus wastes valuable data transmission bandwidth. For example, assigning or de-assigning an SCCH can take up to a half-second.

To reduce assignments and de-assignments and associated delays, a mobile station can operate in a discontinuous transmission (DTX) mode while a SCCH is assigned to the mobile station. The DTX mode permits the mobile station to stop transmitting on the assigned SCCH while data is unavailable. This is referred to as the DTX "black-out" period. The DTX mode also permits the mobile station to resume transmitting as soon as data becomes available, thus avoiding delays associated with assigning and de-assigning the SCCH. Transmitted data frames typically do not include DTX "on/off" information for similar reasons as mentioned above with regard to rate information. Since the receiver of the assigned SCCH receives no explicit indicator regarding the black-out periods, the receiver continuously demodulates and decodes the SCCH as long as the SCCH is assigned, even during the black-out period when no data is being transmitted, that is, when the demodulated and decoded data is invalid.

Therefore, it is desirable at a receiver in a communication system to discriminate between data transmission periods and black-outs so as to reduce a likelihood that invalid data is declared to be valid at the receiver.

In accordance with IS-95B, each transmitted SCCH data frame includes a 12 bit Cyclic Redundancy Code (CRC) for checking the validity of the data in the data frame at the receiver. Additional observable metrics, such as a Yamamoto measure, a symbol error rate, a frame energy, and so on, can be used to further improve on the CRC check. There is a finite probability ($2^{-12}=2.4\times10^{-4}$) that demodulated random data associated with the black-out period, or noise corrupting a received data frame, will cause an erroneous match of the 12 bit CRC. In the case of a black-out period, a non-existent SCCH data frame or "random frame" corresponding to the erroneous CRC match, erroneously labels the invalid random frame as a valid data frame.

As is known, the transmitter and receiver typically implement complementary or parallel, layered, communication protocol layers including a physical protocol layer and an overlaying Radio Link Protocol (RLP) layer. One known RLP layer useable in wireless data communication stations is the IS-707 Radio Link Protocol. The physical layer sends (and receives) supposedly valid data frames (for example, data frames passing the CRC check as mentioned above) to (and from) the RLP. The RLP at the receiver tracks RLP frame sequence numbers embedded in the data frames for purposes of errored frames re-transmission and control.

During black out-periods, it has been observed that passing random frames as valid data frames to the RLP causes the RLP to initiate error control processes. This can occur on either the FCCH or SCCHs. For example, the RLP will reset and re-synchronize itself if the received sequence number, supposedly embedded in the random frame, is outside of a predetermined sequence number window (for example, 255) away from an expected sequence number. Alternatively, the RLP will request a retransmission of all of the data frames between the received and expected sequence numbers. In either case, the RLP error control processes disadvantageously reduce useful data throughput on the channel since most of the available bandwidth is utilized to re-sync the RLP or retransmit numerous data frames.

Therefore, there is a need to more accurately validate data frames at a receiver in a communication system, to thereby reduce the occurrence of such RLP error control processes and correspondingly increase channel bandwidth efficiency over conventional techniques.

SUMMARY OF THE INVENTION

The present invention provides a method and apparatus for maximizing throughput of a data call in a wireless communication system in which data is transmitted from a wireless station, such as a mobile station, on multiple assigned channels in accordance with a known transmission standard, such as IS-95B. In one embodiment, the multiple assigned channels include a fundamental channel and at least one supplemental channel. Data is formatted into variable rate data frames and transmitted on the fundamental and supplemental channels. A wireless receiver, such as a base station, receives the multiple assigned channels. The wireless receiver demodulates and decodes data frames associated with each of the multiple assigned channels. The wireless receiver determines a likely initial data rate for each demodulated and decode data frame. The wireless receiver correlates all of the likely data rates, by comparison to one another and to a relevant transmission protocol standard, to determine a maximum likelihood combination of data rates. The maximum likelihood combination of data rates includes a maximum likelihood data rate corresponding to each likely data rate. Decoded data frames are invalidated and erased when the likely data frame rates do not match corresponding maximum likelihood data rates.

Features and Advantages

The present invention overcomes the above mentioned problems and represents an improvement over known rate determination and data validation techniques in a wireless data communication receiver.

The present invention accurately determines a variable transmitted data rate for packet data traffic at a wireless receiver without embedding rate information into the transmitted data.

The present invention advantageously reduces a likelihood that invalid data will be declared valid at the wireless receiver during both periods of data transmission and blackouts. More specifically, the present invention enhances the accuracies of rate determination and data validation at the receiver, and results in an increase in a traffic channel bandwidth efficiency over conventional techniques.

In a communication system including fundamental and supplemental channels operating in accordance with IS-95B, the present invention improves the accuracies of rate determination and data validation on the fundamental channel using supplemental channel signal quality measurements.

BRIEF DESCRIPTION OF THE FIGURES

The foregoing and other features and advantages of the invention will be apparent from the following, more particular description of the exemplary embodiments of the invention, as illustrated in the accompanying drawings.

DETAILED DESCRIPTION OF THE PREFERRED EMBODIMENTS

Figure 1:
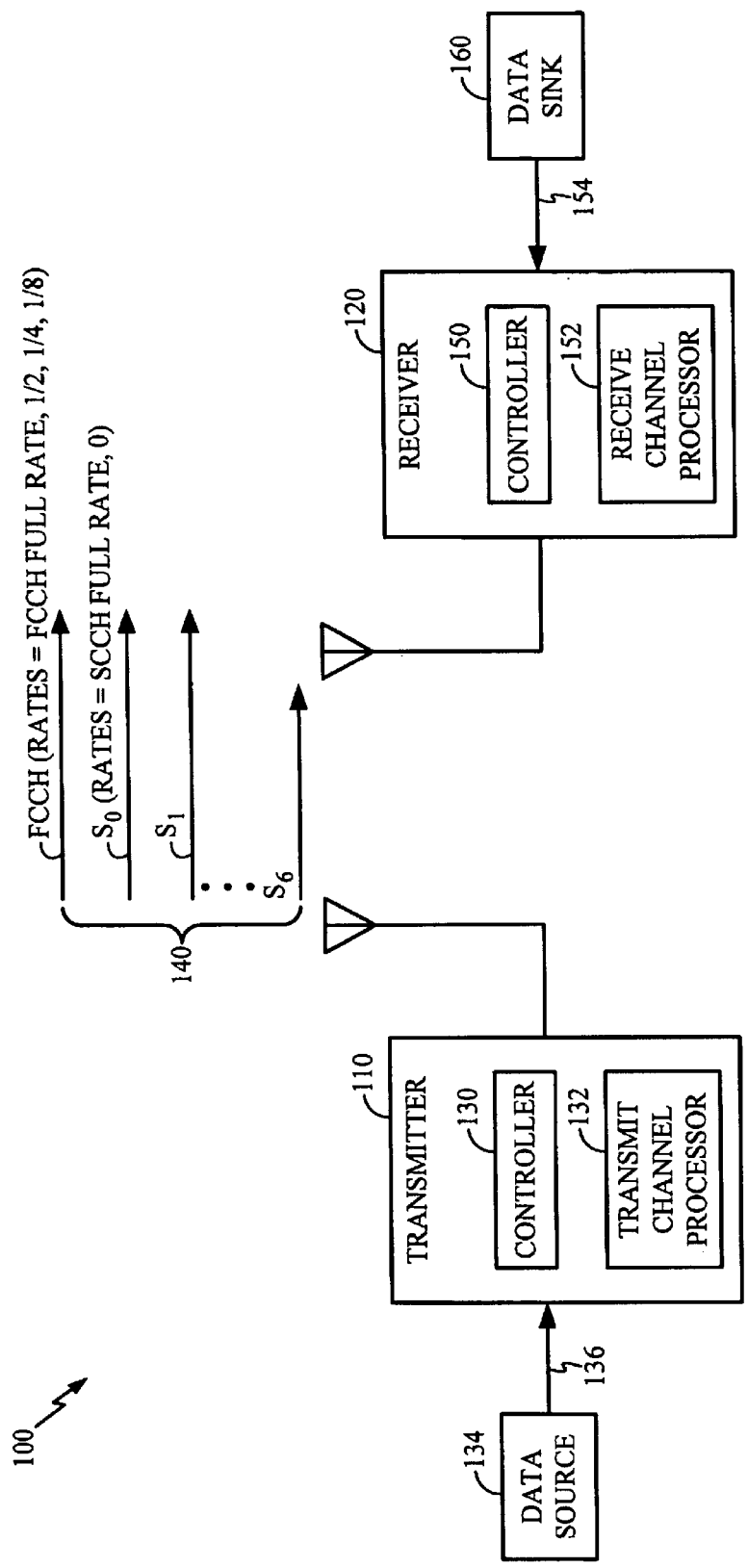
FIG. 1 is a block diagram of an exemplary digital communications system 100 in which the present invention can be implemented.

FIG. 1 is a block diagram of an exemplary digital communications system 100 in which the present invention can be implemented. In an exemplary embodiment, system 100 is a CDMA cellular telephone system. However, it is to be understood that the present invention is applicable to other types of communication systems such as personal communications systems (PCS), wireless local loop, private branch exchange (PBX) or other known systems. The present invention is also applicable to systems using other well known transmission modulation schemes such as TDMA. System 100 includes a wireless transmitter 110 and a wireless receiver 120, each of which can be part of a base station (also known as a cell-site) or a mobile station. Communication from transmitter 110 to receiver 120 when receiver 120 is disposed in a mobile station is known as the "forward link," and communication from transmitter 110 to receiver 120 when receiver 120 is disposed in a base station is known as the "reverse link." In the exemplary embodiment, transmitter 110 is disposed in a wireless station, such as the mobile station, and receiver 120 is disposed in the base station. Also, transmitter 110 and receiver 120 operate in accordance with IS-95B. The exemplary CDMA system operating in accordance with IS-95B allows for data communications between users over terrestrial links. The exemplary embodiment also applies to a CDMA system operating in accordance with International Telecommunications Union wireless data communication standards for third generation, International Mobile Telecommunications (IMT-2000).

Exemplary transmitter 110 includes a controller 130 for controlling the operation of transmitter 110 and for exchanging communication signaling information with receiver 120 to assign and de-assign communication channels during call-setup and tear-down, for example. Transmitter 110 includes a transmit channel processor 132 for performing transmit channel processing for one or more communication channels assigned to transmitter 110.

A data source 134 provides data 136 at variable data rates to transmitter 110. Data 136 can be synchronous or asynchronous packet data, as is known in the art. In turn, transmitter 110 formats data 136 into consecutive, variable rate data frames, each having an exemplary duration of 20 milliseconds. In the exemplary embodiment, an RLP processing component (not shown) at transmitter 110 and operating in accordance with TIA/EIA/IS-707 (referred to as "IS-707"), embeds consecutive frame sequence numbers in consecutive data frames for purposes of error correction and control. Then, transmit channel processor 132 further processes the data frames to prepare the data frames for wireless transmission to receiver 120, as will be further described below.

Transmitter 110 transmits the data frames to receiver 120 on a traffic channel 140 assigned to transmitter 110. In the exemplary embodiment, traffic channel 140 is a reverse link IS-95B traffic channel operating in accordance with the HSPD feature of IS-95B. The IS-95B reverse link traffic channel 140 includes a fundamental code channel (FCCH) F, and can include up to seven additional supplemental code channels (SCCHs) $S_0$, $S_1$, $S_2$, $S_3$, $S_4$, $S_5$, $S_6$. The FCCH is a variable rate channel capable of operating at data frame rates (also referred to herein as "rates") including an FCCH full rare, a half rate, a quarter rate, and an eighth rate. The FCCH can carry data 136 from data source 134 and signaling information. Each of the assigned SCCHs $S_0$–$S_6$ can operate at only an SCCH full rate when data is to be transmitted and at a zero rate during DTX periods when no data is available to be transmitted. Under IS-95, SCCHs S0–S7 can only transmit (at the SCCH full rate) when the FCCH is concurrently transmitting at the FCCH full rate. The present invention takes advantage of this IS-95B traffic channel restriction to improve the accuracies of determining FCCH frame rates and validating received data frames, as will be further described below.

In accordance with IS-95B, the above mentioned rates fall into two categories, namely, a first rate set RS1, and a second rate set RS2. RS1 includes the following rates:

1) FCCH rates of 9600 bps (the RS1 FCCH full rate), 4800 bps, 2400 bps, or 1200 bps; and 2) SCCH rates of 9600 bps (the RS1 SCCH full rate) or zero bps.

On the other hand, RS2 includes the following rates:

1) FCCH rates of 14,000 bps, 7200 bps, 3600 bps, and 1800 bps; and

2) SCCH rates of 14,000 bps or zero bps. It is to be understood that the present invention is applicable to communication systems having a greater or lesser number of data frame rates.

Still with reference to FIG. 1, receiver 120 includes a controller 150 for controlling the receiver and for exchanging signaling information with transmitter 110 to assign and de-assign traffic channels. Receiver 120 also includes a receive channel processor 152 for receiving traffic channel 140 and for processing received data frames so as to recover packet data 154, corresponding to packet data 136, at transmitter 110. Receiver 120 delivers packet data 154 to a data sink 160. In the exemplary embodiment, receiver 120 and transmitter 110 both implement complementary RLP layers in accordance with IS-707. Controller 150 can include one or more controllers, and can encompass one or more processing functions of receive channel processor 152.

Figure 1A:
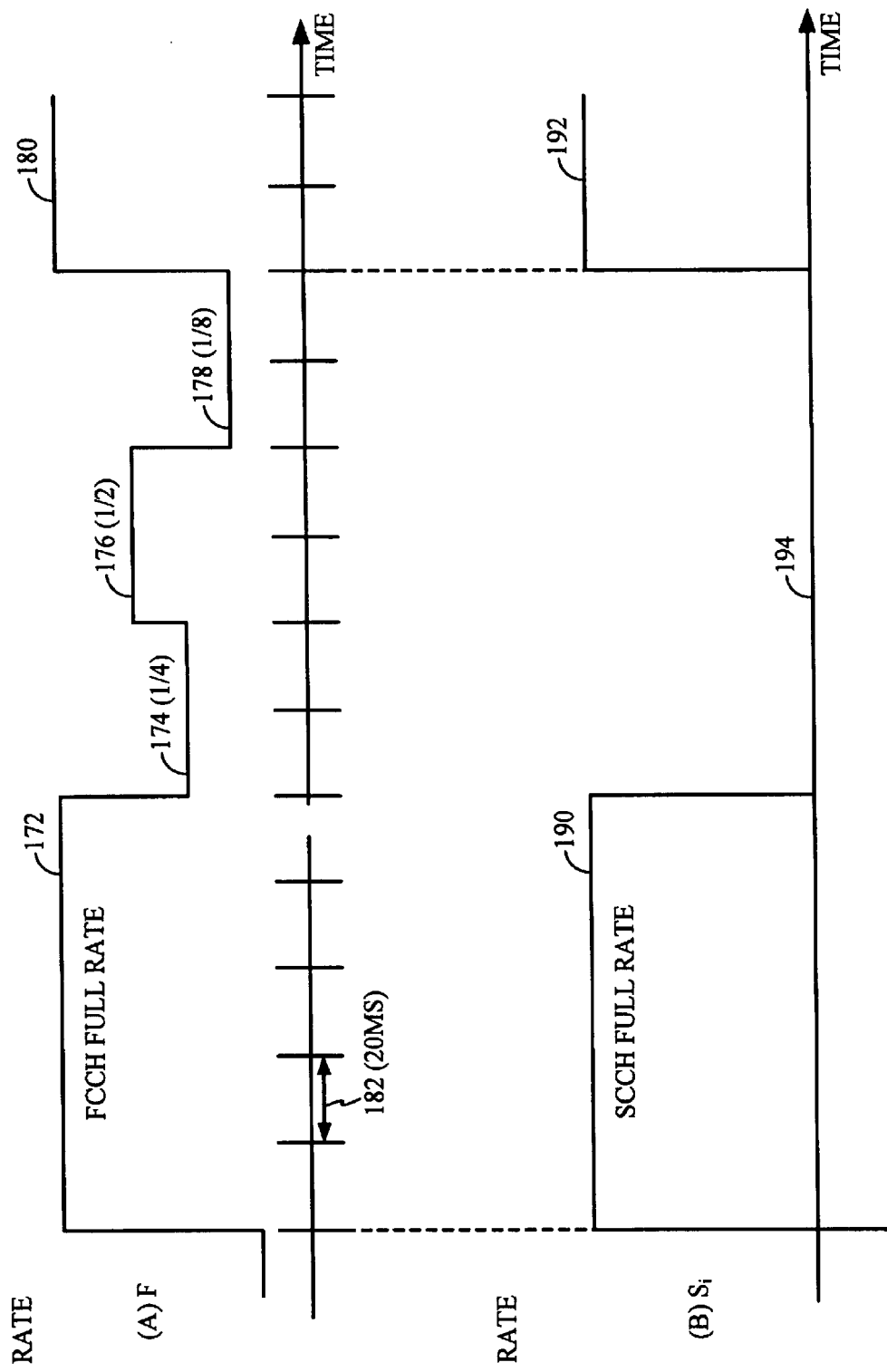
FIG. 1A is an illustration of an exemplary transmit timing diagram of an FCCH and an exemplary transmit timing diagram of a concurrently assigned SCCH.

The above mentioned channel transmission requirements of the IS-95B HSPD feature are illustratively depicted in FIG. 1A. An exemplary transmit timing diagram (a) of the FCCH F and an exemplary transmit timing diagram (b) of a concurrently assigned SCCH $S_i$, are depicted in FIG. 1A. Timing diagram (a) is a plot of the FCCH transmitted rate (Rate) versus time, and timing diagram (b) is a plot of the SCCH Si transmitted rate (Rate) versus time.

Referring to timing diagram (a), transmitter 110 transmits on the FCCH at the full, quarter, half, eighth, and full rates during consecutive portions 172, 174, 176, 178 and 180 of the timing diagram. A time interval 182 represents the duration of a single transmitted data frame, such as 20 ms.

Referring to timing diagram (b), transmitter 110 concurrently transmits on SCCH $S_i$ at the SCCH full rate during portions 190 and 192 respectively coinciding with portions 172 and 180 of timing diagram (a), in accordance with IS-95B. Conversely, transmitter 110 transmits on SCCH $S_i$ at a zero rate (that is, transmitter 110 does not transmit) during portion 194 of timing diagram (b) coinciding with portions 174–178 of timing diagram (a). Portion 194 of timing diagram (b) corresponds to a black-out or DTX period on SCCH $S_i$. Also, it is to be understood the FCCH frames can be transmitted at the FCCH full rate while the SCCH $S_i$ is at the zero rate.

Figure 2:
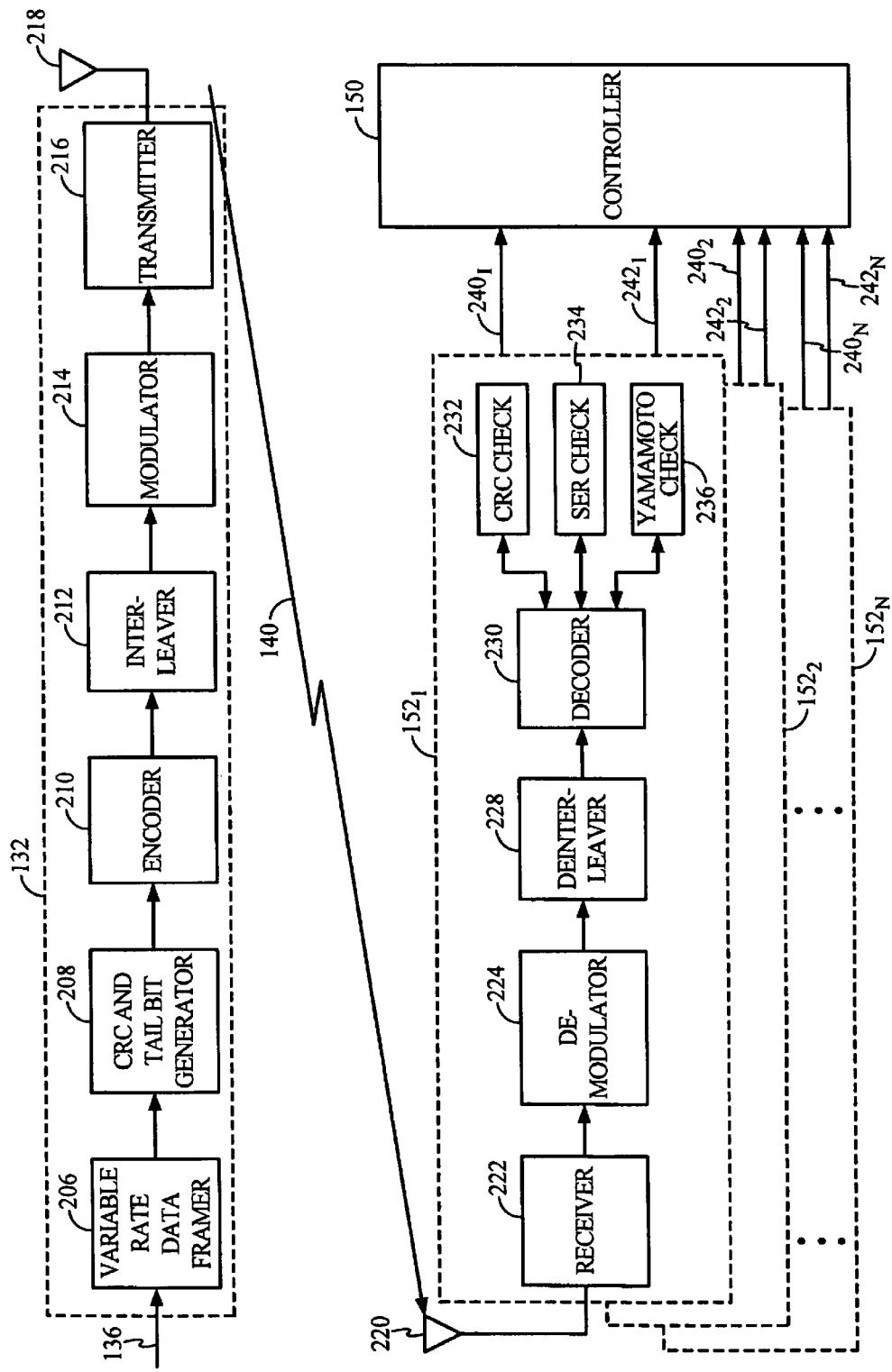
FIG. 2 is a block diagram of an exemplary transmit channel processor and a block diagram of an exemplary receive channel processor from FIG. 1.

FIG. 2 is a block diagram of exemplary transmit channel processor 132 of transmitter 110 and a block diagram of exemplary receive channel processor 152 of receiver 120. In transmit channel processor 132, a variable rate data framer 206 receives variable rate data 136, frames the variable rate data into variable data rate frames (also referred to herein as "frames"), and provides the frames to a cyclic redundancy code and tail bit generator 208, as applicable under IS-95B (for example, only 9600 and 4800 bps FCCH frames and 9600 SCCH frames receive CRCs under IS-95B RS1). CRC generator 208 generates a set of CRC bits, such as 12 CRC bits, to provide for error detection at receiver 120. In addition, generator 208 appends a sequence of tail bits to each frame. In the exemplary embodiment, generator 208 generates the CRC and tail bits in accordance with IS-95B. Generator 208 provides a data frame to an encoder 210 for encoding the data as symbols for error correction and detection at receiver 120. In the exemplary embodiment, encoder 210 is a convolutional encoder. Encoder 210 provides encoded symbols to an interleaver 212. Interleaver 212 reorders the encoded symbols in accordance with a predetermined interleaving format. In the exemplary embodiment, interleaver 212 is a block interleaver, which is known in the art.

Interleaver 212 provides a reordered data frame to a modulator 214 for modulating the data frame for transmission. In the exemplary embodiment, modulator 214 is a CDMA modulator. Modulator 214 provides a modulated data frame to a transmitter module 216. Transmitter module 216 up-converts and amplifies the up-converted signal for transmission via an antenna 218. Transmitter module 216 transmits data frames to receiver 120 on traffic channel 140.

Receiver 120 receives traffic channel 140 via an antenna 220. Antenna 220 provides the received traffic channel to a plurality of parallel receive channel processors $152_1$–$152_n$. Each of receive channel processors $152_1$–$152_n$ is assigned by receiver controller 150 to perform receive channel processing on a corresponding one of the received traffic channels F and $S_0$–$S_n$ (also referred to herein as "F–$S_n$"). For example, receive channel processor $152_1$ can be assigned to the FCCH, while the next receive channel processor $152_2$ can be assigned to SCCH $S_0$, and so on. In this manner, receive processing for any one of the received channels F–$S_n$ can be performed independently of the receive processing for any of the other received traffic channels.

Receive channel processor 152, performs receive channel processing as is now described. Receive antenna 220 provides received traffic channel 140 to a receiver module 222. Receiver module 222 down converts and amplifies the received traffic channel and provides a down converted and amplified received traffic channel to a demodulator 224, which demodulates the received channel. In the exemplary embodiment, demodulator 224 is a CDMA demodulator. In another embodiment, each of receive channel processors $152_1$–$152_n$ can share a single demodulator. Demodulator 224 provides a demodulated signal, namely, demodulated data frames, to de-interleaver 228. De-interleaver 228 re-orders demodulated data frame symbols in accordance with a predetermined format, as is known in the art.

De-interleaver 228 provides a re-ordered data frame to a decoder 230 for decoding the data frame. In the case where receive channel processor 152, is assigned to the FCCH, decoder 230 is preferably a multi-rate Viterbi decoder capable of decoding FCCH full rate, half rate, quarter rate and eighth rate received data frames associated with the FCCH, as is known in the art. In the case where receive channel processor $152_1$ is assigned to an SCCH, $S_i$, decoder 230 need only decode full rate data frames since SCCH $S_i$ can operate at only the SCCH full rate or the zero rate. As mentioned above, although the transmitted date frame rate can change on a frame by frame basis, rate information is typically not included in each transmitted data frame. Therefore, receiver 120 determines the transmitted rate for each received data frame to accurately decode and validate the data frame.

The decoding and CRC checking processes for a received FCCH frame are now described. In the exemplary embodiment, decoder 230 decodes symbols in the received FCCH frame for each of the four possible transmitted rates (that is, the FCCH full, half, quarter, and eighth rates) so as to provide four separately decoded frames, each of which is provided to a CRC check detector 232. Using conventional techniques, CRC check detector 232 determines whether the CRC bits for each of the four decoded frames are correct. CRC check detector 232 performs a CRC check for the CRC bits in each of the four decoded frames to determine at which of the full, half, quarter, or eighth rates the currently received frame was transmitted. As a result, in one embodiment, CRC check detector 232 provides four check bits, $C_1$, $C_2$, $C_4$, $C_8$, where the subscripts "1", "2", "4", and "8" respectively corresponding to the full rate, half rate, quarter rate, and eighth rate, and where a binary value of "1" for a given CRC check bit can indicate that the CRC check bits passed, while a binary value of "0" can indicate that the CRC bits failed.

In addition, decoder 230 provides decoded frame data to a Symbol Error Rate (SER) detector 234. Specifically, SER detector 234 receives decoded frame bits and an estimate of the received symbol data from decoder 230. As is known, SER detector 234 re-encodes and re-decodes the decoded bits, and compares them to the estimate of the received symbol data from decoder 230. The SER is a count of the number of discrepancies between the re-encoded symbol data and the received symbol data. Therefore, SER detector 234 generates four SER values: $SER_1$, $SER_2$, $SER_3$, and $SER_4$.

Furthermore, decoder 230 provides information to a Yamamoto check detector 236 for providing a confidence metric based on the difference between the selected path through a trellis and the next closest path through the trellis. The Yamamoto quality metric is well known in the art, and is further described, for example, in U.S. Pat. Nos. 5,710,784 and 5,872,775. While the CRC check is dependent on the bits in each of the four decoded frames, the Yamamoto check is dependent on the decoding process of receiver 120. Yamamoto detector 136, similar to detectors 232 and 234, provides four Yamamoto values for each of the four possible rates: $Y_1$, $Y_2$, $Y_4$, and $Y_8$. Although detectors 232, 234, 236 are shown as separate elements, the detectors can be incorporated within the hardware and/or software processes of decoder 230.

Receive channel processor 152, collectively provides the CRC check bits, SER values, and Yamamoto values from respective detectors 232, 234 and 236 to controller or control processor 150 as a data frame quality metric signal $240_1$. Data frame quality metric signal $240_1$ is indicative of the quality (and thus validity) of decoded data corresponding to the data frame. Using data frame quality metric signal $240_1$, control processor 150 determines at which of the four rates the currently received FCCH data frame was transmitted. For example, in the exemplary embodiment, the control processor selects a rate corresponding to a passed CRC and a favorable SER value.

Receive channel processor $152_1$ also provides a decoded frame signal $242_1$ to the control processor. Decoded frame signal $242_1$ includes each of the separately decoded frames corresponding to the four different frame rates. Decoded frame signal $242_1$ can be provided to a decoded data memory buffer so as to be accessible to the control processor.

The decoding and CRC checking processes performed on a received SCCH frame are similar to those processes described above for a received FCCH frame, as is now described. In the case where a receive channel processor (such as receive channel processor $152_2$) is assigned to SCCH $S_i$, the associated decoder 230 decodes each received data frame at only the SCCH full rate. In this case, the assigned receive channel processor provides a single decoded SCCH data frame to control processor 150. Also, the receive channel processor provides the associated data frame quality metrics (for instance, the CRC, SER and Yamamoto values) associated with the decoded SCCH frame to control processor 150. Thus, in the case where multiple receive channel processors $152_1$–$152_n$ respectively process multiple receive channels F, $S_0$–$S_n$, the receive channel processors respectively provide data frame quality metrics signals $240_1$–$240_n$ and decoded frame signals $242_1$–$242_n$ to the control processor.

High-Level Method

Receiver controller 150 uses the above described signal quality metrics signals $240_1$–$240_n$ to initially determine current FCCH and SCCH frame rates and to initially validate the associated, decoded FCCH and SCCH frames. The present invention then refines and thus improves the accuracy of such initial determinations, as is further described below.

Figure 3:
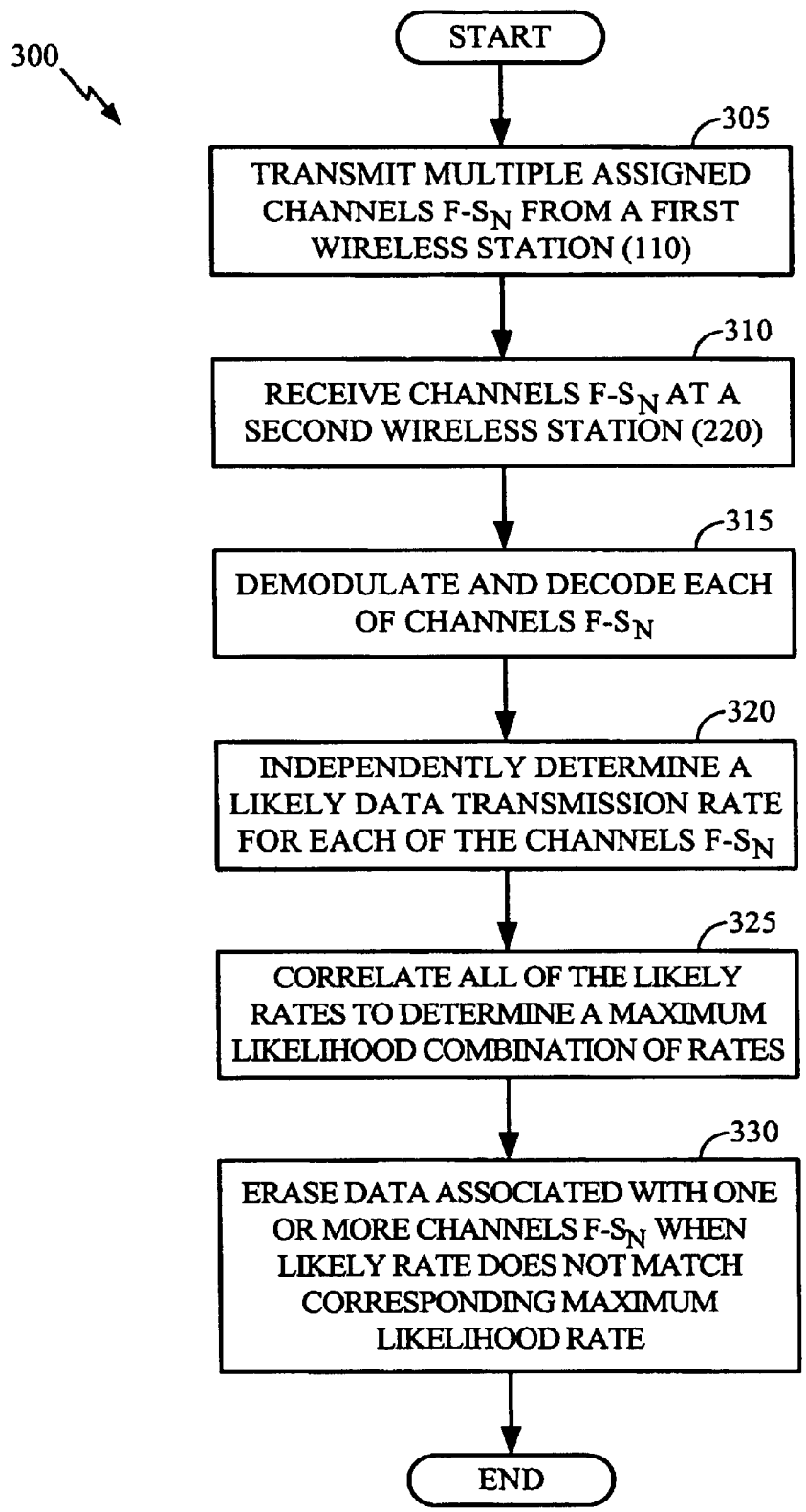
FIG. 3 is an illustration of an exemplary high-level method of determining a maximum likelihood combination of rates used for validating decoded frames at a receiver of FIG. 1.

FIG. 3 is an illustration of an exemplary high-level method 300 of determining a maximum likelihood combination of rates used for validating decoded frames at receiver 120, according to the present invention. Method 300 advantageously improves the likelihood of providing only valid received frames to subsequent processing stages such as the RLP processing layer and/or data sync 160. In doing so, method 300 reduces RLP error processing and correspondingly increases useful traffic channel bandwidth over other known methods, such as, for example, methods using only the above mentioned initial determinations.

Method 300 begins at a step 305 when transmitter 110 transmits data frames on multiple assigned traffic channels F–$S_n$. At a next step 310, receiver 120 receives traffic channels F–$S_n$. At a next step 315, receiver 120 demodulates, de-interleaves and decodes each of the received channels F–$S_n$ as described in connection with FIG. 2.

At a next step 320, a rate for each of the received channels F–$S_n$ is initially determined independent of the other received channels. Each determined or detected rate can be considered a "likely" rate because it may be incorrect if, for example, errors have corrupted the corresponding transmitted frame. In the exemplary embodiment, the likely rate for each SCCH is determined to be the SCCH full rate when the CRC check bits pass and the SER values are favorable for the decoded SCCH frame. When the likely rate is equal to the SCCH full rate, the associated SCCH decoded frame is assumed valid. On the other hand, when the likely rate is determined to be the zero rate, the associated SCCH data frame is assumed invalid.

In the exemplary embodiment, the likely rate for the FCCH is determined based on CRC check bits $C_1$, $C_2$, $C_4$, $C_8$, and SER values $SER_1$, $SER_2$, $SER_3$, and $SER_4$, provided that CRC check bits are available. Specifically, the likely FCCH rate is determined to be the one of the four possible rates corresponding to the one of the four decoded frames having a passing CRC and a favorable SER value. The decoded frame associated with the selected likely rate is initially assumed valid.

At a next step 325, all of the likely rates determined at step 320 are correlated to produce a Maximum Likelihood (ML) combination of rates for the received traffic channels. The ML combination of rates includes an ML rate corresponding to each likely rate. Each such ML rate can be a probabilistically more accurate estimate of the transmitted rate than is the corresponding likely rate. This is because each likely rate is determined independent of the other traffic channels, whereas the ML rate is determined by correlating all of the independent likely rates. Correlating the independent likely rates adds relevant cross-channel rate information, such as traffic channel interdependencies, to each of the ML rate determinations, to thereby produce a probabilistically better rate estimate.

The correlation includes a comparison of each likely rate to each of the other likely rates. In addition, the correlation can include a comparison of the likely rates to a relevant set of rules, such as the traffic channel transmission requirements for the particular standard (for example, IS-95B) under which the traffic channels were transmitted. Such a comparison adds further relevant information to the process of generating the ML rates. A correlation in accordance with the exemplary embodiment is further described below in connection with FIG. 4.

At a next step 330, one or more of the likely rates determined at step 320 are compared or matched against corresponding ML rates in the ML combination of rates to determine whether to invalidate any of the decoded frames (such as the decoded FCCH frame) initially assumed valid in previous step 320.

Then, all of the decoded frames confirmed as valid in step 330 are provided to the next level of processing, such as the RLP processing layer and/or data sync 160. On the other hand, data frames invalidated at step 325 (and previous step 320) are "erased," that is, such invalidated frames are not provided to the next level of processing. For example, the FCCH frame and one or more SCCH frames may be invalidated at step 330, based on the results from step 325.

Exemplary Method Embodiment

Figure 4:
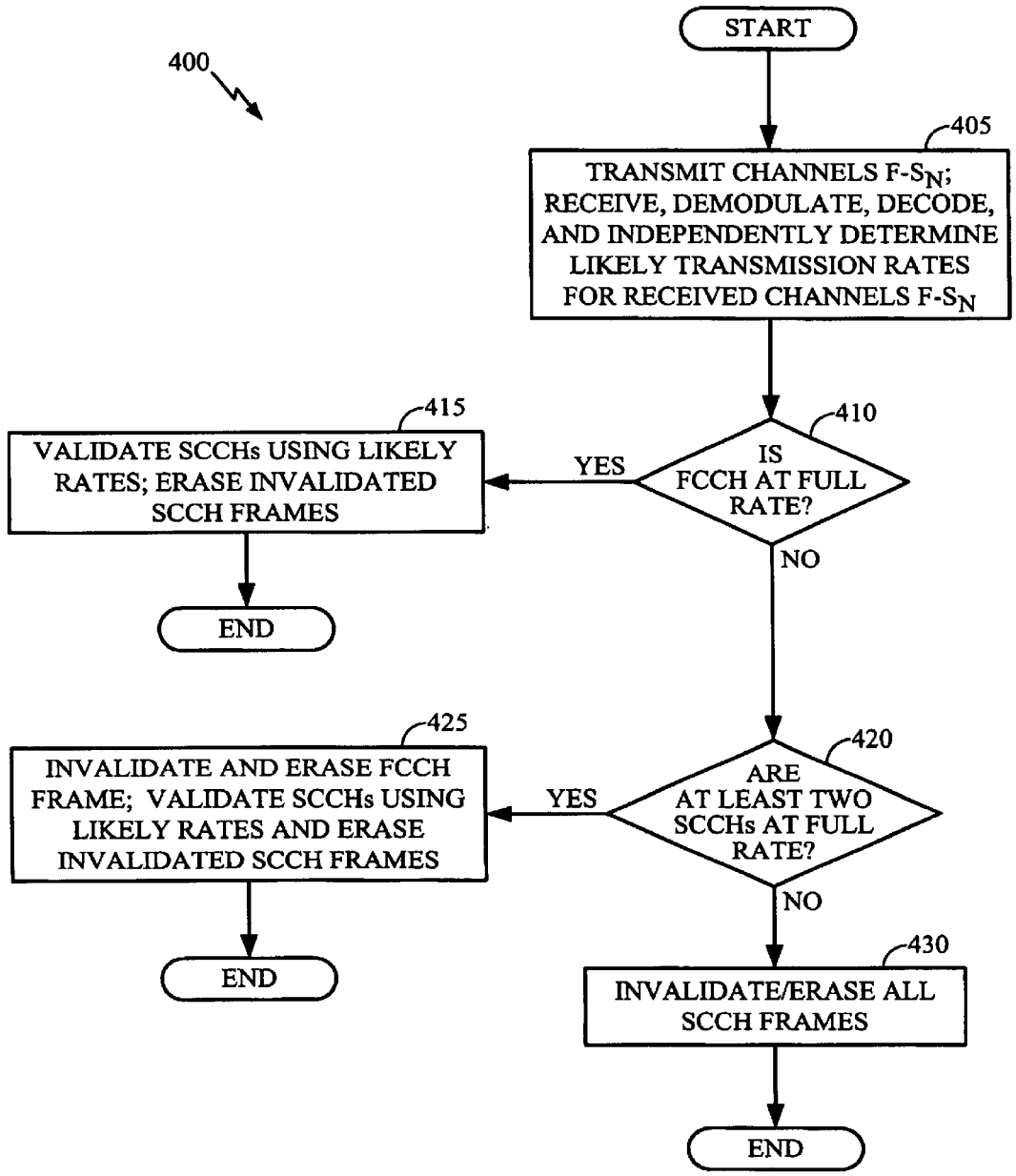
FIG. 4 is an illustration of a method corresponding to an exemplary embodiment of the present invention, wherein a receiver of FIG. 1 receives IS-95B reverse-link traffic channels.

FIG. 4 is an illustration of a method 400 corresponding to the exemplary embodiment of the present invention, wherein receiver 120 receives reverse-link traffic channels operating in accordance with IS-95B. The principles embodied in exemplary method 400 also apply to any wireless data communication system operating in accordance with IMT-2000. The method steps of FIG. 4 are first described below, and then, a rationale supporting the method steps is provided. Steps 305, 310, 315, and 320 described above in connection with FIG. 3 are collectively represented in a single initial step 405 of method 400.

Next, at a decision step 410, it is determined whether the likely FCCH rate is at the FCCH full rate. If the likely FCCH rate is at the FCCH full rate, the decoded FCCH frame is assumed valid for use at the next processing stage, and flow proceeds to a step 415.

At step 415, decoded frames associated with received SCCHs are validated based on the respective likely rates of the decoded frames, as follows. First, the likely rates for the SCCHs (that is, the likely rate of each SCCH frame transmitted concurrently with the FCCH frame) are determined as described above. Then, decoded SCCH frames associated with full rates and zero rates are respectively assumed valid and invalid. Invalid SCCH frames are erased.

On the other hand, if at step 410 it is determined that the FCCH rate is at other than full rate, then flow proceeds to a next decision step 420. At decision step 420 it is determined whether at least two of the SCCHs have likely rates equal to the SCCH full rate. If at least two of the SCCHs have likely rates equal to the SCCH full rate, then flow proceeds to a step 425 where the decoded FCCH data frame (determined to be at other than the FCCH full rate at step 410) is assumed invalid and erased. The SCCHs are validated in accordance with their respective likely rates as described in connection with step 415.

On the other hand, if at step 420 it is determined that less than two of the SCCHs are at the SCCH full rate, then flow proceeds to a step 430 where all of the concurrently received SCCH decoded frames are erased.

Decisional Analysis

The decisional logic embodied in method 400 is supported by a combination of the IS-95B requirements described above and by a probability analysis now described. The probability analysis considers two relevant probabilities. A first relevant probability $P_e$ arises when an FCCH frame is transmitted at the FCCH full rate. In this case there is a finite probability, $P_e$, that the likely FCCH rate initially determined at step 410 will be erroneous, that is, the likely rate may be determined to be a rate other than the full rate (such as a half, quarter or eighth rate). This finite probability $P_e$ is referred to as the "rate determination error for a full rate frame". The probability of detecting a full rate frame as other than a full rate frame, that is, the "probability of a rate determination error for a full rate frame" can be determined from Table 1 below. Table 1 is an excerpt from the TIA/EIA-IS-98B "Recommended Minimum Performance Standards for Dual Mode Wideband Spread Spectrum Cellular Mobile Stations" (referred to herein as "IS-98B"). Table 1 tabulates for the FCCH the minimum probabilities of rate determination error for IS-95B Rate Set 1 (RS1) and Rate Set 2 (RS2) full rate frames. RS1 full rate frames are assumed for the present discussion.

TABLE 1

Minimum Probabilities of Rate Determination Errors

| FCCH Rate | Min. Probability of Rate Detection Error at 1% FER (obtained from IS-98B) | |
|---|---|---|
| | RS1 Full | RS2 Full |
| Half | $1.67 \times 10^{-5}$ | $1.67 \times 10^{-5}$ |
| Quarter | $1.41 \times 10^{-4}$ | $2.38 \times 10^{-4}$ |
| Eighth | $1.73 \times 10^{-4}$ | $2.73 \times 10^{-4}$ |

Table 1 includes a first column listing FCCH rates, a second column listing error probabilities for RS1 FCCH full rate frames, and a third column listing error probabilities for RS2 FCCH full rate frames. Table 1 includes three rows respectively corresponding to half, quarter and eighth rates. The first row indicates the probability of erroneously detecting a full rate frame as a half rate frame. Similarly, the second row indicates the probability of erroneously detecting a full rate frame as a quarter rate frame, and so on.

The total minimum probability of a rate determination error ($P_e$) for detecting an RS1 FCCH full rate frame as other than a full rate frame is the addition of the error probabilities, from Table 1, of detecting the frame rate as one of the other three frame rates. In other words, the probability of erroneously detecting an FCCH frame transmitted at the full rate as other than the full rate is given by:

$$P_e = 1.67 \times 10^{-5} + 1.41 \times 10^{-4} + 1.73 \times 10^{-4} = 3.31 \times 10^{-4}$$

A second probability, $P_C$, relates to erroneously detecting an invalid received SCCH frame as a valid frame, for example, during a DTX period. As mentioned above, a transmitted SCCH data frame includes a 12 bit CRC. When the CRC passes at receiver 120, the corresponding SCCH frame is assumed valid. It is to be understood that SER can also used for supplemental rate decisions, but that it is ignored here to simplify this probability analysis. Invalid frames can be received, for example, during a DTX period, when transmitted frames are corrupted with noise, or when transmitted frames are substantially attenuated during transmission. In such circumstances, there is the finite probability $P_c$ of detecting a valid CRC at receiver 120 even though invalid data is being received and demodulated. The random probability $P_c$ of a 12 bit CRC matching any random bit sequence at receiver 120 is $2.4 \times 10^{-4}$. Further, assuming SCCH channels are statistically independent from each other for the purpose of calculating such a random probability, then the random probability $P_{cc}$ of two SCCHs both passing CRCs is given by:

$$P_{cc} = P_c \times P_c, \text{ where } P_c = 2.4 \times 10^{-4}$$

therefore $P_{cc} = 2.4 \times 10^{-4} \times 2.4 \times 10^{-4} = 5.96 \times 10^{-8}$ A comparison between $P_{cc}$ and $P_e$ reveals that $P_{cc} \ll P_e$, by several orders of magnitude. Since SCCH data frames can only be transmitted (at the SCCH full rate) when FCCH data frames are transmitted at the FCCH full rate under IS-95B, the probabilistic comparison $P_{cc}$ vs. $P_e$ definitively suggests the following conclusion: when a FCCH frame is detected at a rate other than the full rate (for example, at the half, quarter or eighth rate) and at the same time or concurrently (that is, for the same 20 ms frame interval) at least two SCCH data frames associated with two SCCHs are detected at the full rate, it is much more likely than not that the FCCH non full rate determination is erroneous and that the FCCH data frame was actually transmitted at the full rate. In other words, the initial FCCH non full-rate determination is most likely wrong, and therefore should be overruled.

Under such circumstances, it is likely the FCCH data frame is corrupted (or a DTX period is in progress) and probabilities dictate that it is safer to invalidate and erase the FCCH frame than it is to provide such a corrupted frame to the RLP. Method 400 thus improves FCCH rate detection during HSPD calls by filtering-out invalid FCCH data frames in accordance with the result of the above described correlation between all of the received traffic channel rates, and the further comparison of the rates against the IS-95B transmission requirements.

The above described probabilistic comparison $P_{cc}$ vs. $P_e$ definitively suggests the FCCH non full-rate determination should be overruled when at least two SCCHs are at the full-rate. On the other hand, when only one SCCH is determined to be at the full rate, a relevant probabilistic comparison $P_c$ ($2.4 \times 10^{-4}$) vs. $P_e$ ($3.31 \times 10^{-4}$) is much less definitive since $P_c$ and $P_e$ are substantially the same, that is, within an order of magnitude of one another. Relative to the earlier probability comparison, this comparison suggests it is just as likely the FCCH data frame was transmitted at the FCCH full rate as it was not transmitted at the FCCH full rate when only one SCCH channel is detected at the SCCH full rate. Under such conditions, probability does not justify overruling a determination that the FCCH is not full-rate based on a single SCCH channel being full rate.

Therefore, in the exemplary embodiment, when the FCCH rate is not full rate and only one SCCH is full rate, the SCCH frame is invalidated/erased while the FCCH data frame is assumed valid and provided to the next processing stage. This approach is taken because experience has shown erasure of a valid SCCH data frame is less harmful than providing an invalid SCCH frame to the RLP.

Figure 5:
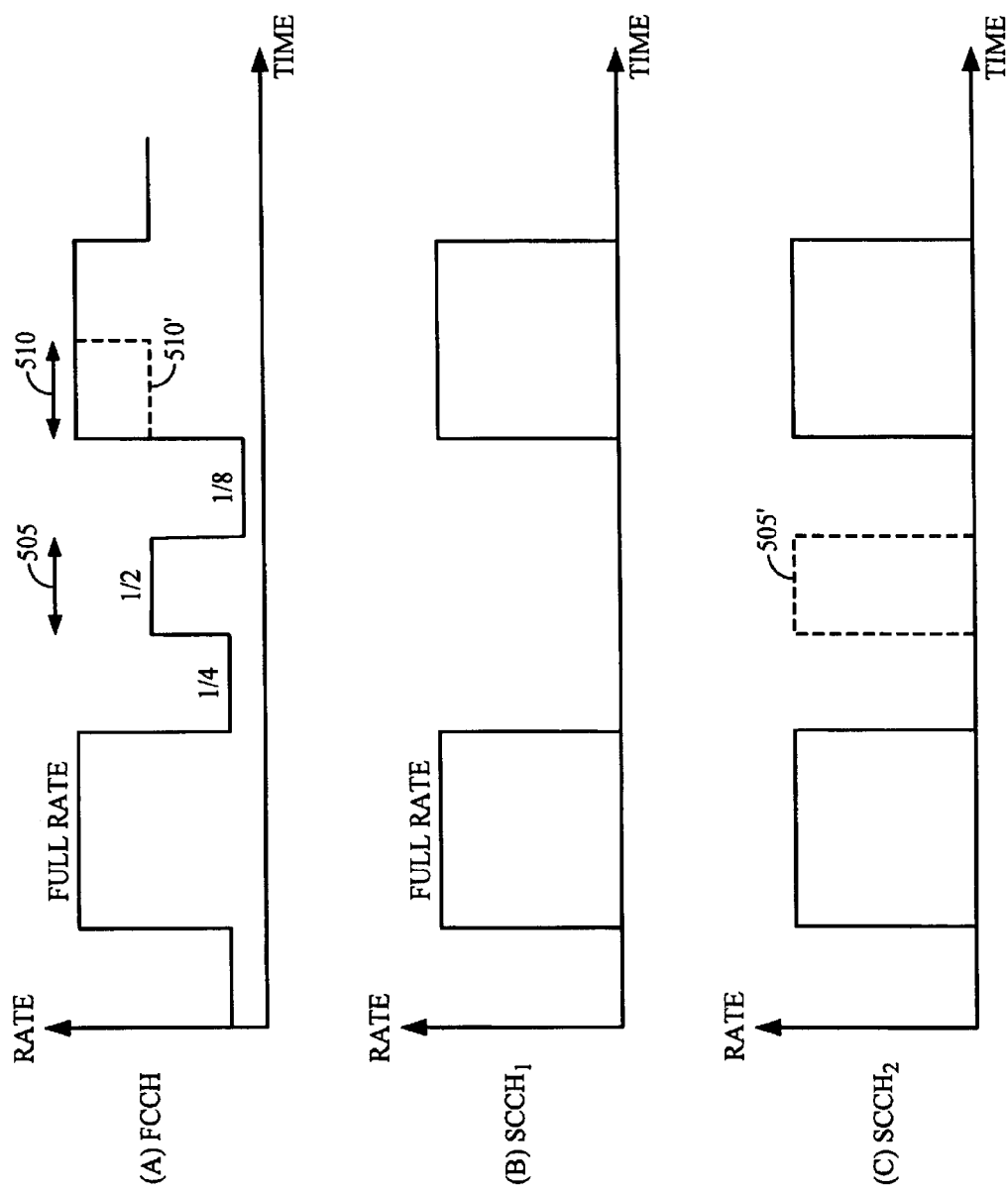
FIG. 5 is an illustration of three exemplary timing diagrams (a), (b), and (c) corresponding respectively to an FCCH and two assigned SCCHs, and used to illustrate the method of FIG. 4.

Method 400 is now illustrated with reference to FIG. 5. FIG. 5 is an illustration of exemplary timing diagrams (a), (b) and (c) corresponding respectively to the FCCH and two assigned SCCHs. In diagrams (a), (b) and (c), the timing waveforms in solid line represent transmitted frame rates. At receiver 120, the detected rates (that is, the determined likely rates) are in accordance with the transmitted rates, except during a first frame interval 505 and a second frame interval 510 (depicted in timing diagram (a)), where respective erroneous likely rates 505' (timing diagram (c)) and 510' (timing diagram (a)) are depicted in dotted line.

During interval 505, while the FCCH rate is at the half rate, $SCCH_2$ is erroneously determined to be at the SCCH full rate (that is, the SCCH likely rate is equal to the SCCH full rate). Such a condition is not allowed under IS-95B. In this situation, method 400 invalidates and erases a decoded $SCCH_2$ frame associated with interval 505 in favor of the FCCH half rate detected during the same time interval.

During interval 510, while the FCCH is erroneously determined to be at the FCCH half rate, at least two concurrent SCCH full rate frames are detected, namely, full rate frames for $SCCH_1$ and $SCCH_2$. Such a condition is not allowed under IS-95B. In this situation, method 400 invalidates and erases the decoded FCCH frame in favor of the two SCCH full rate frames.

Table 2 below provides an exemplary illustration of the operation of method 400. Table 2 tabulates SCCH and FCCH frame erasure decisions in accordance with method 400 when up to four SCCH are assigned and received at receiver 120. The legend or key for interpreting Table 2 is as follows:

F=Full Rate; and

!F=not full rate (that is, Quarter, Half or Eighth Rate);

TABLE 2

Example of new algorithm

| Fund | S1 | S2 | S3 | S4 | S5 | S6 | S7 | Action |
|---|---|---|---|---|---|---|---|---|
| !F | F | | | | | | | Erase S1 |
| !F | F | F | | | | | | Erase F |
| !F | F | !F | | | | | | Erase S1 |
| !F | !F | F | | | | | | Erase S2 |
| !F | !F | !F | | | | | | Erase S1, S2 |
| !F | F | F | F | | | | | Erase F |
| !F | F | F | !F | | | | | Erase F, S3 |
| !F | F | !F | F | | | | | Erase F, S2 |
| !F | F | !F | !F | | | | | Erase S1 |
| !F | !F | F | F | | | | | Erase F, S1 |
| !F | !F | F | !F | | | | | Erase S2 |
| !F | !F | !F | F | | | | | Erase S3 |
| !F | !F | !F | !F | | | | | Erase S1, S2, S3 |
| !F | F | F | F | F | | | | Erase F |
| !F | F | F | F | !F | | | | Erase F, S4 |
| !F | F | F | !F | F | | | | Erase F, S3 |
| !F | F | F | !F | !F | | | | Erase F, S3, S4 |
| !F | F | !F | F | F | | | | Erase F, S2 |
| !F | F | !F | F | !F | | | | Erase F, S2, S4 |
| !F | F | !F | !F | F | | | | Erase F, S2, S3 |
| !F | F | !F | !F | !F | | | | Erase S1 |
| !F | !F | F | F | F | | | | Erase F, S1 |
| !F | !F | F | F | !F | | | | Erase F, S1, S4 |
| !F | !F | F | !F | F | | | | Erase F, S1, S3 |
| !F | !F | F | !F | !F | | | | Erase S2 |
| !F | !F | !F | F | F | | | | Erase F, S1, S2 |
| !F | !F | !F | F | !F | | | | Erase S3 |

TABLE 2-continued

Example of new algorithm

| Fund | S1 | S2 | S3 | S4 | S5 | S6 | S7 | Action |
|------|----|----|----|----|----|----|----|--------|
| !F | !F | !F | !F | F | | | | Erase S4 |
| !F | !F | !F | !F | !F | | | | Erase S1–S4 |

Receiver 120 can perform specific features of the present invention using receiver controllers, which in effect comprise a computer system. Although communication-specific hardware can be used to implement the present invention, the following description of a general purpose computer system is provided for completeness. The present invention is preferably implemented in software. Alternatively, the invention may be implemented using hardware or a combination of hardware and software. Consequently, the invention may be implemented in a computer system or other processing system.

Figure 6:
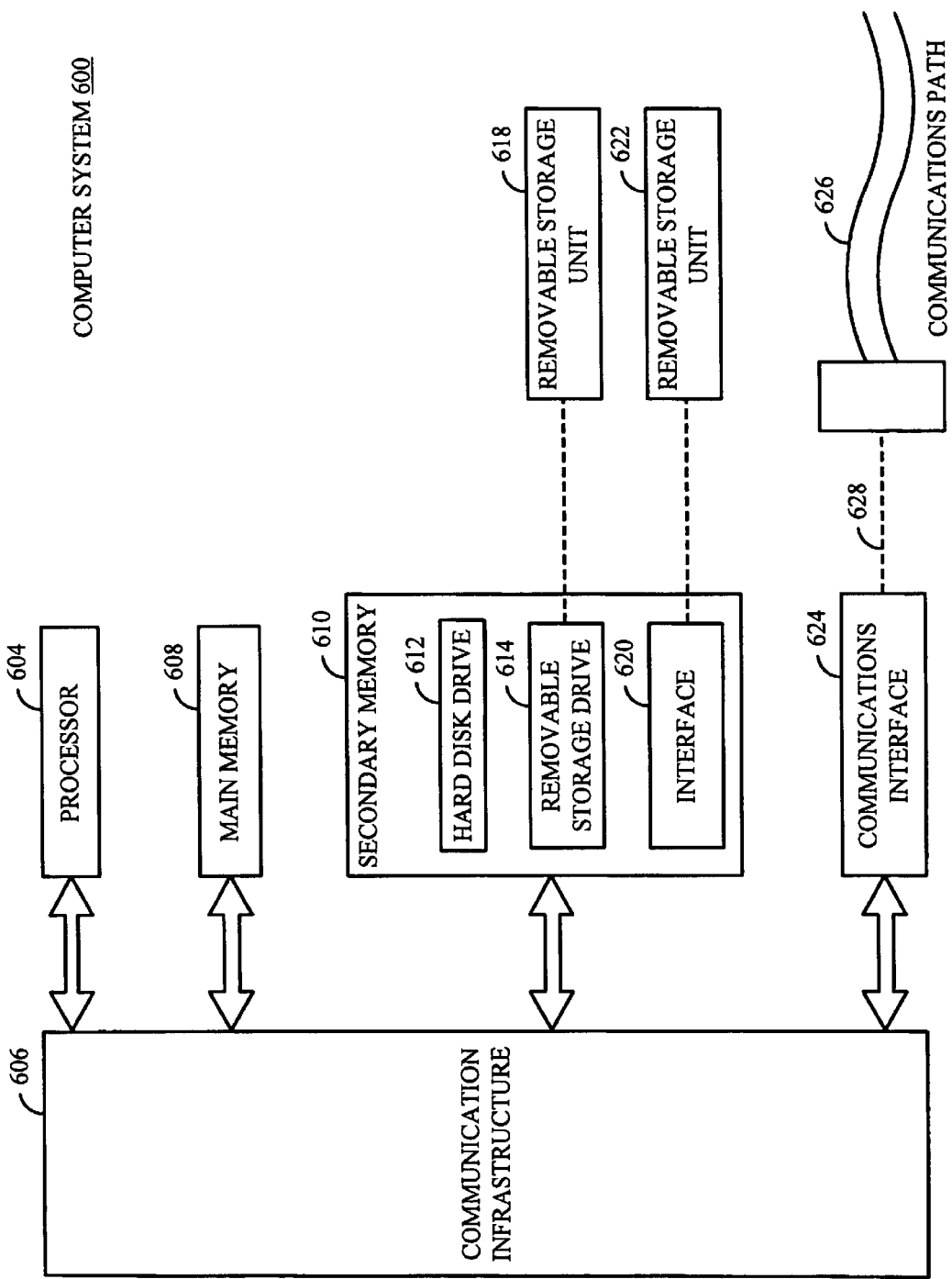
FIG. 6 is a block diagram of an exemplary computer system on which the present invention can be implemented.

An example of such a computer system 600 is shown in FIG. 6. In the present invention, for example, the above described methods or processes execute on computer system 600. The computer system 600 includes one or more processors, such as processor 604. The processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the process of the present invention. Accordingly, such computer programs represent controllers of the computer system 600. By way of example, in a preferred embodiment of the invention, the processes performed by receiver controller 150 can be performed by computer control logic. Where the invention is implemented using software, the software may be stored in a computer program product and loaded into computer system 600 using removable storage drive 614, hard drive 612 or communications interface 624.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of maximizing throughput of a data call in a wireless communication system in which data is transmitted from a wireless station on multiple assigned channels including a fundamental channel on which data can be transmitted at a first data rate and supplemental channels on which data can be transmitted at a second data rate only when data is being transmitted at the first data rate on the fundamental channel, wherein it is more likely than not that data is being transmitted at the first data rate on the fundamental channel when the supplementary channels have likely data rates equal to the second rate, comprising:

a. receiving the multiple assigned channels;

b. demodulating and decoding each of the multiple assigned channels;

c. determining a likely data rate of each of the multiple assigned channels;

d. correlating all of the likely data rates to determine one or more Maximum Likelihood (ML) data rates each corresponding to a likely data rate; and e) invalidating and erasing demodulated and decoded data associated with the fundamental channel when;

i) the fundamental channel does not have a likely data rate equal to the first data rate, and ii) the supplementary channels have likely data rates equal to the second data rate.

2. The method of claim 1, further comprising:

f. invalidating data associated with one of the multiple assigned channels when the likely data rate and a corresponding ML data rate of the one of the multiple assigned channels do not match.

3. The method of claim 1, wherein the multiple assigned channels collectively form an IS-95B reverse-link traffic channel, and wherein the first data rate corresponds to a fundamental channel full rate and the second rate corresponds to a supplemental channel full rate, the method further comprising invalidating and erasing demodulated and decoded data associated with each of the plurality of supplemental channels when a) the fundamental channel does not have a likely data rate equal to the fundamental channel full rate, and b) only one of the plurality of supplemental channels has a likely data rate equal to the supplemental channel full rate.

4. The method of claim 3, further comprising the step of providing non-invalidated data to a radio link protocol processing layer.

5. The method of claim 1, wherein the data transmitted on the multiple assigned channels is formulated into data frames, and wherein step (b) comprises the steps of:

demodulating the data frames to produce demodulated data frames; and de-interleaving the demodulated data frames to produce de-interleaved data frames.

6. The method of claim 5, further comprising the steps of:

decoding the de-interleaved data frames to produce decoded data frames; and generating a signal quality signal indicative of a signal quality for each of the decoded data frames.

7. The method of claim 6, likely data rate of each of the decoded data frames based on a corresponding signal quality metric signal.

8. The method of claim 6, wherein each of the data frames includes a Cyclic Redundancy Code (CRC), and wherein the generating step comprises at least one of:

generating a CRC for each of the decoded data frames; and generating a Symbol Error Rate (SER) for each of the decoded data frames.

9. The method of claim 8, wherein step (c) comprises determining a likely data rate of each of the data frames on each of the multiple assigned channels based on at least one of a CRC and an SER for each of the decoded data frames.

10. Apparatus for maximizing throughput of a data call in a wireless communication system in which data is transmitted by a wireless station to a receiver on multiple assigned channels including a fundamental channel on which data can be transmitted at a first data rate and supplemental channels on which data can be transmitted at a second data rate only when data is being transmitted at the first data rate on the fundamental channel, wherein it is more likely than not that data is being transmitted at the first data rate on the fundamental channel when a plurality of the supplemental channels have likely data rates equal to the second data rate, comprising:

receiving means for receiving the multiple assigned channels;

demodulating means and decoding means for respectively demodulating and decoding each of the multiple assigned channels;

determining means for determining a likely data rate of each of the multiple assigned channels;

correlating means for correlating all of the likely data rates to determine a maximum likelihood combination of data rates; and means for invalidating and erasing demodulated and decoded data associated with the fundamental channel when i) the fundamental channel does not have a likely data rate equal to the first data rate, and at the same time, ii) the plurality of supplemental channels have likely data rates equal to the second data rate.

11. The apparatus of claim 10, wherein the maximum likelihood combination of data rates includes a maximum likelihood data rate corresponding to each said likely data rate, the apparatus further comprising invalidating means for invalidating data associated with one of the multiple assigned channels when the likely data rate of the one multiple assigned channel as determined by the determining means fails to match a corresponding maximum likelihood data rate determined by the correlating means.

12. The apparatus of claim 11, wherein the data transmitted on the multiple assigned channels is formatted into data frames, and wherein:

the demodulating means includes means for demodulating the data frames to produce demodulated data frames; and the de-interleaving mean includes means for de-interleaving the demodulated data frames to produce de-interleaved data frames.

13. The apparatus of claim 12, wherein the decoding means include means for decoding the de-interleaved data frames to produce decoded data frames; and generating means for generating a signal quality signal indicative of a signal quality for each of the decoded data frames.

14. The apparatus of claim 13, wherein the determining means includes means for determining a likely data rate of each of the decoded data frames based an a corresponding signal quality metric signal.

15. The apparatus of claim 13, wherein each of the data frames includes a Cyclic Redundancy Code (CRC), and wherein the generating means comprises at least one of:

means for generating a CRC for each of the decoded data frames; and means for generating a Symbol Error Rate (SER) for each of the decoded data frames.

16. The apparatus of claim 15, wherein the determining means determines a likely data rate of each of the data frames on each of the multiple assigned channels based on at least one of a CRC and an SER for each of decoded data frames.

17. The apparatus of claim 10, wherein the multiple assigned channels collectively form an IS-95B reverse-link traffic channel, and wherein the first data rate corresponds to a fundamental channel full rate and the second rate corresponds to a supplemental channel full rate, the apparatus further comprising means for invalidating and erasing demodulated and decoded data associated with the plurality of supplemental channels when a) the fundamental channel does not have a likely data rate equal to the fundamental channel full rate, and b) only one of the plurality of supplemental channels has a likely data rate equal to the supplemental channel full rate.

18. The apparatus of claim 17, further comprising a radio link protocol processing layer and means for providing no-invalidated data to the radio link protocol processing layer.

19. A method of maximizing throughput of a data call in a wireless communication system in which data is transmitted from a wireless station on multiple assigned channels, including include a fundamental channel on which data can be transmitted at a first non-zero data rate and supplemental channels on which data can be transmitted at a second non-zero data rate only when data is being transmitted at the first data rate on the fundamental channel, wherein it is approximately equally likely that data is being transmitted and that data is not being transmitted at the first data rate on the fundamental channel when only one of a plurality of supplemental channels has a likely data rate equal to the second data rate, and wherein it is approximately equally likely that data is being transmitted and that data is not being transmitted at the first data rate on the fundamental channel when only one of a plurality of supplemental channels has a likely data rate equal to the data rate, comprising:

a. receiving the multiple assigned channels;

b. demodulating and decoding each of the multiple assigned channels;

c. determining a likely data rate of each of the multiple assigned channels;

d. correlating all of the likely data rates to determine one or more Maximum Likelihood (ML) data rates each corresponding to a likely data rate; and e. invalidating and erasing demodulated and decoded data associated with each of the plurality of supplemental channels when i) the fundamental channel does not have a likely data rate equal to the first data rate, and ii) only one of the plurality of supplemental channels has a likely data rate equal to the second data rate.

20. Apparatus for maximizing throughput of data call in a wireless communication system in which data is transmitted by a wireless station to a receiver on multiple assigned channels including a fundamental channel and supplemental channels, wherein data can be transmitted at a first non-zero data rate on the fu28 (new): Apparatus for maximizing throughput of a data call in a wireless communication system in which data is transmitted by a wireless station to a receiver on multiple assigned channels including a fundamental channel and supplemental channels, wherein data can be transmitted at a first non-zero data rate on the fundamental channel, wherein data can be transmitted at a second non-zero data rate on the supplemental channel only when data is being transmitted at the first data rate on the fundamental channel, and wherein it is approximately equally likely that data is being transmitted and that data is not being transmitted at the first data rate on the fundamental channel when only one of a plurality of supplemental channels has a likely data rate equal to the second data rate, comprising:

receiving means for receiving the multiple assigned channels;

demodulating means and decoding means for respectively demodulating and decoding each of the multiple assigned channels;

determining means for determining a likely data rate of each of the multiple assigned channels; and correlating means for correlating all of the likely data rates to determine a maximum likelihood combination of data rates, means for invalidating and erasing demodulated and decoded data associated with the plurality of supplemental channels when:

i) the fundamental channel does not have a likely data rate equal to the first data rate, and ii) only one of the plurality of supplemental channels has a likely data rate equal to the second data rate.

\* \* \* \* \*